(12) United States Patent
Tagare et al.

(10) Patent No.: US 12,424,940 B2
(45) Date of Patent: Sep. 23, 2025

(54) DISTRIBUTED POWER MANAGEMENT WITH SEPARATE PEAK AND AVERAGE POWER PATHS

(71) Applicant: Apple Inc., Cupertino, CA (US)

(72) Inventors: Madhavi V. Tagare, San Jose, CA (US); Vijayanish Varadharajan, Milpitas, CA (US); Rong Guo, Cupertino, CA (US); Mao Ye, San Jose, CA (US); Benedict Foo, Mountain View, CA (US); Soledad Calderon Arroyo, San Francisco, CA (US); Hao Zhou, San Jose, CA (US); Chongli Cai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 203 days.

(21) Appl. No.: 18/463,228

(22) Filed: Sep. 7, 2023

(65) Prior Publication Data

US 2025/0088103 A1    Mar. 13, 2025

(51) Int. Cl.
*H02M 3/158* (2006.01)
*G06F 1/26* (2006.01)
(Continued)

(52) U.S. Cl.
CPC ............ *H02M 3/158* (2013.01); *G06F 1/263* (2013.01); *G06F 1/28* (2013.01); *G06F 1/3203* (2013.01);
(Continued)

(58) Field of Classification Search
CPC .......... G06F 1/263; G06F 1/28; G06F 1/3203; G06F 1/3212; G06F 1/324; G06F 1/3287;
(Continued)

(56) References Cited

U.S. PATENT DOCUMENTS

| 5,883,797 | A | * | 3/1999 | Amaro | H02J 1/102 323/272 |
| 6,369,462 | B1 | * | 4/2002 | Siri | H02J 3/381 307/51 |

(Continued)

OTHER PUBLICATIONS

Xiaoguo Liang et al., "Evaluation of Narrow Vdc-Based Power Delivery Architecture in Mobile Computing System", IEEE Transactions on Industry Applications, IEEE Service Center, Piscataway, NJ, US, vol. 47, No. 6, Nov. 1, 2011 (Nov.1, 2011), pp. 2539-2548, XP011371428, ISSN: 0093-9994, DOI: 10.1109/TIA.2011. 2168802, figures 1-4, 6-7.

(Continued)

*Primary Examiner* — Yusef A Ahmed
(74) *Attorney, Agent, or Firm* — DICKINSON WRIGHT RLLP

(57) ABSTRACT

A power management circuit for a computer system is disclosed. The power management circuit includes a power storage circuit, a first power converter circuit, and a second power converter circuit. The first power converter circuit sources a current to a regulated power supply node via a first inductor under average load conditions using a voltage level of an input power supply node. During high-load transient conditions, the second power converter circuit provides additional current to the regulated power supply node via a second inductor using a voltage generated by the power storage circuit.

14 Claims, 12 Drawing Sheets

(51) Int. Cl.
*G06F 1/28* (2006.01)
*G06F 1/3203* (2019.01)
*G06F 1/3212* (2019.01)
*G06F 1/324* (2019.01)
*G06F 1/3287* (2019.01)
*G06F 11/30* (2006.01)
*H02J 1/10* (2006.01)
*H02J 7/34* (2006.01)
*H02M 1/00* (2006.01)
*H02M 3/156* (2006.01)

(52) U.S. Cl.
CPC ............ *G06F 1/3212* (2013.01); *G06F 1/324* (2013.01); *G06F 1/3287* (2013.01); *G06F 11/3062* (2013.01); *H02J 1/102* (2013.01); *H02J 1/106* (2020.01); *H02J 7/34* (2013.01); *H02M 1/0032* (2021.05); *H02M 3/156* (2013.01)

(58) Field of Classification Search
CPC ....... G06F 11/3062; H02J 1/102; H02J 1/106; H02J 7/34; H02M 1/0032
See application file for complete search history.

(56) References Cited

U.S. PATENT DOCUMENTS

| | | | | |
|---|---|---|---|---|
| 6,686,862 B1* | 2/2004 | Tagare | ................. | H03K 5/1565 327/172 |
| 8,878,501 B2* | 11/2014 | Kalje | ................. | H02M 3/1584 323/272 |
| 10,511,234 B2* | 12/2019 | Zhang | .................. | H02M 7/537 |
| 10,778,101 B1* | 9/2020 | Schmitz | ............. | H02M 3/1584 |
| 11,086,378 B1 | 8/2021 | Couleur et al. | | |
| 11,340,680 B2 | 5/2022 | Bemat et al. | | |
| 11,557,962 B2 | 1/2023 | Parto | | |
| 2002/0118000 A1* | 8/2002 | Xu | ........................ | H02M 3/158 323/259 |
| 2005/0093525 A1* | 5/2005 | Walters | ............... | H02M 3/1584 323/272 |
| 2005/0179324 A1* | 8/2005 | Petricek | .................... | H02J 1/10 307/44 |
| 2007/0013350 A1* | 1/2007 | Tang | .................. | H02M 3/1584 323/237 |
| 2007/0200538 A1* | 8/2007 | Tang | .................... | H02M 3/1584 323/237 |
| 2009/0140706 A1* | 6/2009 | Taufik | ................. | H02M 3/1584 323/272 |
| 2010/0013306 A1* | 1/2010 | Heineman | ............... | H02J 1/001 307/32 |
| 2011/0169327 A1* | 7/2011 | Bonnet | .................. | H02J 1/102 307/82 |
| 2012/0286750 A1* | 11/2012 | Xu | ........................ | H02M 3/156 323/282 |
| 2014/0232368 A1* | 8/2014 | Dally | .................. | H02M 3/1584 323/311 |
| 2014/0266073 A1 | 9/2014 | Keller | | |
| 2015/0326120 A1* | 11/2015 | Kelin | ..................... | H02M 3/156 323/282 |
| 2015/0381026 A1* | 12/2015 | Tournatory | ........... | H02M 3/158 323/271 |
| 2017/0063239 A1* | 3/2017 | Wu | ..................... | H02M 3/1584 |
| 2018/0083534 A1* | 3/2018 | Pant | ..................... | H02M 3/158 |
| 2019/0190279 A1* | 6/2019 | Xu | ........................ | H02J 7/00712 |
| 2021/0247827 A1* | 8/2021 | Couleur | .................... | G06F 1/28 |
| 2021/0273565 A1* | 9/2021 | Pant | ..................... | H02M 3/157 |
| 2021/0408911 A1* | 12/2021 | Upadhyaya | ............... | G06F 1/28 |
| 2022/0029536 A1* | 1/2022 | Zyuban | .................... | H03K 5/24 |
| 2022/0052540 A1* | 2/2022 | Perry | ..................... | G06F 1/263 |
| 2022/0069704 A1* | 3/2022 | Puggelli | ................ | H02M 3/158 |
| 2022/0103074 A1* | 3/2022 | Cai | ..................... | H02M 3/1586 |
| 2022/0286053 A1* | 9/2022 | Agrawal | ............. | H02M 3/1584 |
| 2022/0399811 A1* | 12/2022 | Mahapatra | ............ | H02M 1/084 |
| 2023/0043741 A1* | 2/2023 | Jovanovic | ........... | H02M 3/1566 |
| 2023/0047446 A1 | 2/2023 | Liu | | |
| 2023/0047637 A1* | 2/2023 | Kwon | ................. | H02M 3/1582 |
| 2023/0092655 A1* | 3/2023 | Cai | ..................... | H02M 3/1586 323/271 |
| 2023/0188035 A1* | 6/2023 | Bolus | .................... | H02M 3/158 323/271 |
| 2024/0069621 A1* | 2/2024 | Searles | ............... | H02M 1/0025 |
| 2024/0297566 A1* | 9/2024 | Kv | ...................... | H02M 1/0025 |
| 2025/0062678 A1* | 2/2025 | Venkatraman | ....... | H02M 3/1586 |

OTHER PUBLICATIONS

PCT Patent Application No. PCT/US2024/039196—International Search Report and Written Opinion dated Dec. 18, 2024.

* cited by examiner

DISTRIBUTED POWER MANAGEMENT WITH SEPARATE PEAK AND AVERAGE POWER PATHS

FIELD

The described embodiments relate generally to integrated circuits, and more particularly, to techniques for generating regulated power supply voltages.

BACKGROUND

Modern computer systems may include multiple circuit blocks designed to perform various functions. For example, such circuit blocks may include processors or processor cores configured to execute software or program instructions. Additionally, the circuit blocks may include memory circuits, mixed-signal circuits, analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured regulated voltage levels on respective power supply nodes using a voltage level of an input power supply node. Such regulator circuits may employ multiple passive circuit elements, such as inductors, capacitors, and the like.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
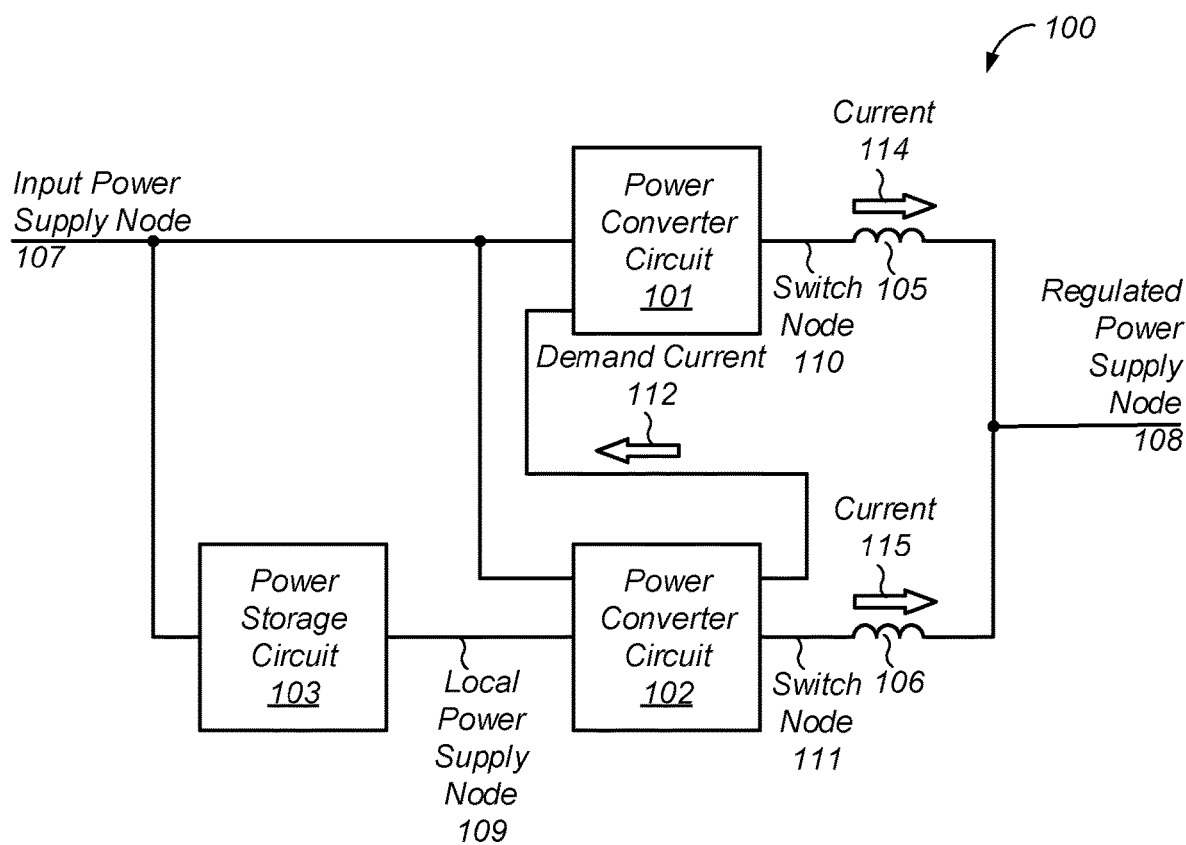
FIG. 1 is a block diagram of a power management circuit.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Computer systems may include multiple circuit blocks configured to perform specific functions. Such circuit blocks may be fabricated on a common substrate and may employ different power supply voltage levels. Power management units (referred to as "PMUs") may include multiple power converter circuits configured to generate regulated voltage levels for various power supply nodes. Such power converter circuits may employ a combination of passive circuit elements (e.g., inductors, capacitors, etc.) as well as active circuit elements (e.g., transistors, diodes, etc.).

Different types of power converter circuits may be employed based on power requirements of load circuits, available circuit area, and the like. One type of commonly used power converter circuit is a buck converter circuit. Such buck converter circuits typically include two switches (also referred to as "power switches") and a switch node that is coupled to a regulated power supply node via an inductor. One switch is coupled between an input power supply node and the switch node and is referred to as the "high-side switch." Another switch is coupled between the switch node and a ground supply node and is referred to as the "low-side switch."

When the high-side switch is closed, the switch node is coupled to the input power supply, allowing a current through the inductor to increase. In addition to providing current to a load, the increase in the current through the inductor also increases the magnetic field of the inductor, allowing the inductor to store energy. A time period when the high-side switch is closed is referred to as an "on-time period" or a "magnetize period."

When the high-side switch is open and the low-side switch is closed, the switch node is coupled to the ground supply node, reversing the voltage across the inductor. During such time periods, often referred to as "off-time periods" or "de-magnetize periods," the inductor functions as a current source which continues to provide current to the load as the magnetic field of the inductor collapses.

The power switches included in a buck converter circuit may be operated in different regulation modes (or simply "modes"). In some cases, a buck converter may employ pulse width modulation (PWM), in which the frequency with which the buck converter circuit completes a cycle of a combination of an on-time period and an off-time period is fixed, but the duration of one of either the on-time period or the off-time period is varied based on a comparison of a voltage level of the regulated power supply node to a reference node.

Alternatively, a buck converter circuit may employ pulse frequency modulation (PFM). When employing PFM, a frequency with which the buck converter circuit completes a cycle (including on-time, off-time, and any idle time) is varied, while the respective durations of the on-time period and off-time period remains fixed. It is noted that depending on load conditions, a buck converter circuit can switch between PWM and PFM modes of operation to efficiently deliver power to a load.

In some computer systems, e.g., a mobile computing device, power may be provided to such a computer system via a weak power source that is supplemented using a battery or other power storage circuit in the computer system. For example, some phones and tablets can employ a USB port as a power source. Such power sources can provide limited average power and charge the battery, but cannot provide sufficient power for transient power peaks of the computer system.

In general, the power profile of a computer system is expected to be at a lower value for long periods of time, and surge to peak power for short durations. For example, in some cases, a computer system may spend 90% of the time consuming average power and 10% of the time at peak power consumption.

To provide sufficient power to a computer system with such a power profile, many computer systems include a multi-stage power delivery path. Such a power delivery path can include a charger circuit that draws power from the power source to charge a battery. A DC/DC power converter circuit, e.g., a buck converter circuit, then draws power from the battery to generate regulated voltage levels on the computer system power nodes or rails. Cascading the charger circuit and the power converter circuit in such a fashion, however, limits the efficiency in providing power to a computer system. For example, if both the charger circuit and the power converter circuit are both 96% efficient, then the efficiency of the overall power delivery path drops to 92.16%. Reductions in efficiency of the power delivery path can result in decreased battery life as well as increased heat generation.

The embodiments illustrated in the drawings and described below provide techniques for employing an additional power converter circuit connected directly to an input power source to improve the efficiency of power delivery to a computer system. The additional power converter circuit can be used to supply the average power to the system by drawing power directly from the input power source, while a power converter circuit coupled to a battery or other power storage circuit can supply additional power to the system during periods of peak power demand.

A block diagram of a power management circuit is depicted in FIG. 1. As illustrated, power management circuit 100 includes power converter circuit 101, power converter circuit 102, power storage circuit 103, inductor 105, and inductor 106.

Power storage circuit 103 is configured to generate a particular voltage level on local power supply node 109. In various embodiments, power storage circuit 103 may be configured to generate the particular voltage level such that it is substantially the same as a voltage level of input power supply node 107. In other embodiments, power storage circuit 103 may be configured to introduce an intentional offset, either higher or lower, between the particular voltage level and the voltage level of input power supply node 107. As described below, power storage circuit 103 may include a charger circuit and one or more batteries.

Power converter circuit 101 is coupled to regulated power supply node 108 via inductor 105. In various embodiments, power converter circuit 101 is configured to source, based on demand current 112, current 114 to regulated power supply node 108 using the voltage level of input power supply node 107.

In various embodiments, current 114 may correspond to an average load current being drawn from regulated power supply node 108. As described below, power converter circuit 101 may be implemented as a buck converter circuit, or any other suitable power converter circuit.

Power converter circuit 102 is coupled to regulated power supply node 108 via inductor 106. In various embodiments, power converter circuit 102 is configured to generate demand current 112 using a voltage level of regulated power supply node 108. Additionally, power converter circuit 102 is configured, in response to a determination that demand current 112 exceeds a threshold value, to source current 115 to regulated power supply node 108 using a voltage level of local power supply node 109.

In various embodiments, current 115 may supplement current 114 during transient peaks in load current being drawn from regulated power supply node 108. During periods of time when the average load current is being drawn from regulated power supply node 108, power converter circuit 102 may be configured to generate demand current 112, but not source current 115 to regulated power supply node 108. As described below, power converter circuit 102 may be implemented using a buck converter circuit, or any other suitable power converter circuit.

Figure 2:
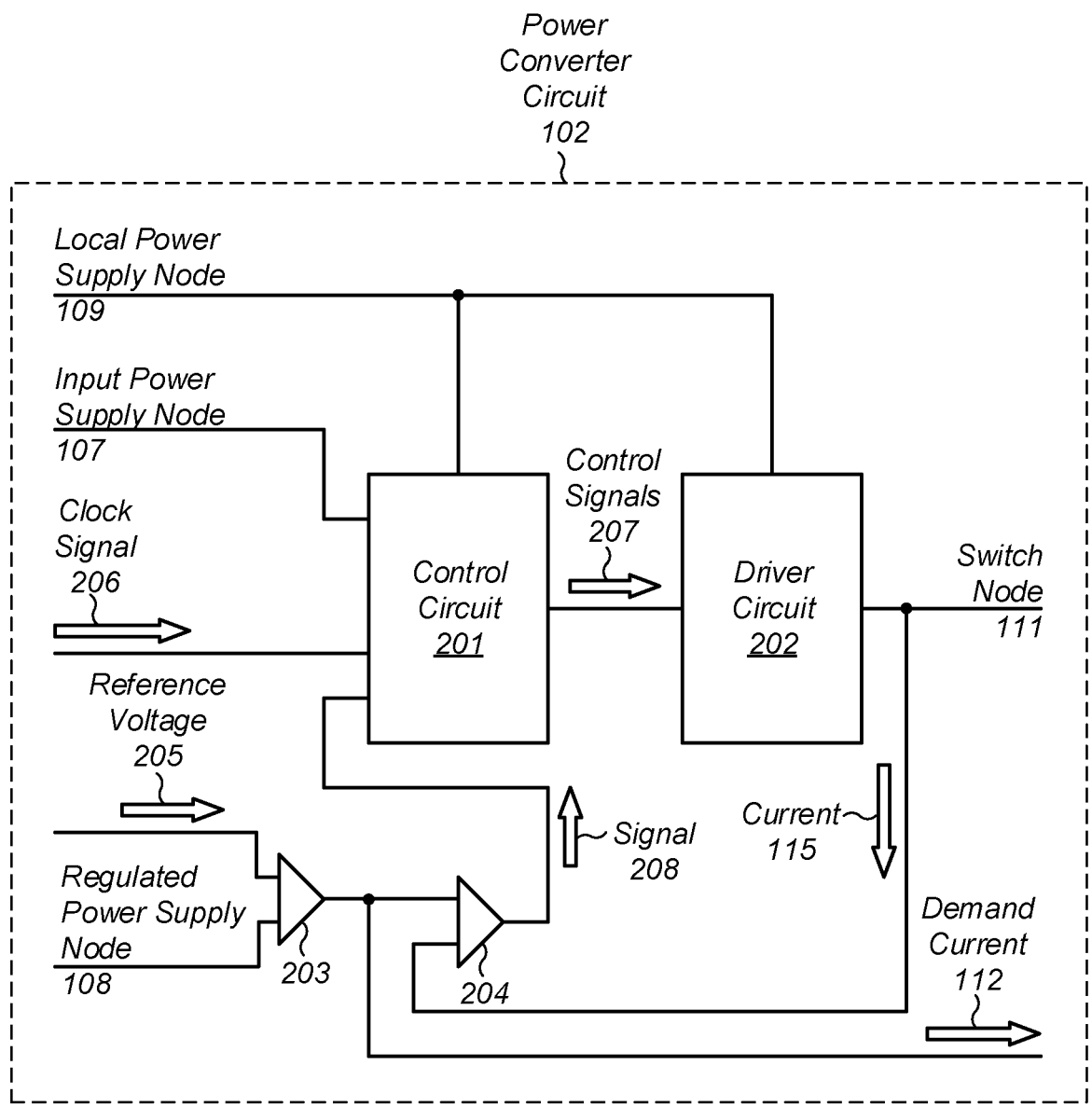
FIG. 2 is a block diagram depicting an embodiment of a power converter circuit.

A block diagram of an embodiment of power converter circuit 102 is depicted in FIG. 2. As illustrated, power converter circuit 102 includes control circuit 201, driver circuit 202, comparator circuit 203, and comparator circuit 204.

Control circuit 201 is configured to draw power from local power supply node 109 to generate control signals 207 using clock signal 206 and signal 208. For example, in some embodiments, control circuit 201 may be configured to activate particular ones of control signals 207 in response to an activation of clock signal 206, and de-activate the particular ones of control signals 207 based on signal 208. In various embodiments, control circuit 201 may be configured to generate control signals 207 according to a PWM or PFM regulation mode. Additionally, control circuit 201 may be configured to switch between PWM and PFM based on a value of signal 208.

In some embodiments, control circuit 201 may hold control signals 207 inactive until demand current 112 reaches a threshold value. In some cases, demand current 112 may need to exceed the threshold value for a particular time period in order for control circuit 201 to begin on-time and off-time periods for driver circuit 202 using control signals 207. In other embodiments, control circuit 201 may be configured to monitor a voltage level of input power supply node 107. In response to a determination that the voltage level of input power supply node 107 is less than a threshold value, control circuit 201 may begin on-time and off-time periods for driver circuit 202 using control signals 207 regardless of the value of demand current 112.

Control circuit 201 may, in some embodiments, be implemented using a state machine or other suitable sequential logic circuit. In some cases, control circuit 201 may also include comparator circuits or any other suitable analog circuits.

Driver circuit 202 is configured to selectively couple switch node 111 to either local power supply node 109 or a ground supply node based on control signals 207. When driver circuit 202 couples switch node 111 to local power supply node 109, current flows from local power supply node 109 into switch node 111 and then into regulated power supply node 108 magnetizing inductor 106. When driver circuit 202 couples switch node 111 to the ground supply node, the voltage across inductor 106 is reversed and inductor 106 sources current to regulated power supply node 108 as its magnetic field collapses. As described below, driver circuit 202 may be implemented using multiple switch devices or transistors that are opened and closed using control signals 207.

Comparator circuit 203 is configured to generate demand current 112 using reference voltage 205 and a voltage level of regulated power supply node 108. As described above, demand current 112 is shared by power converter circuit 101. By sharing demand current 112 between power converter circuit 101 and power converter circuit 102, power management circuit 100 can seamless add or shed power converter circuit 102 to handle transient peaks in load current demand.

Comparator circuit 204 is configured to generate signal 208 using current 115 and demand current 112. To generate signal 208, comparator circuit 204 may be further configured to perform a comparison of demand current 112 and current 115, and generate signal 208 using a result of the comparison. In some embodiments, a magnitude of signal 208 may correspond to a difference between demand current 112 and current 115. In other embodiments, signal 208 may be a digital signal whose value corresponds to whether demand current 112 is greater than or less than current 115.

Comparator circuits 203 and 204 may, in various embodiments, be implemented using differential amplifier circuits. Alternatively, comparator circuits 203 and 204 may be implemented using Schmitt trigger circuits, or any other suitable comparator circuits configured to generate an output signal based on a comparison of at least two input signals.

Figure 3:
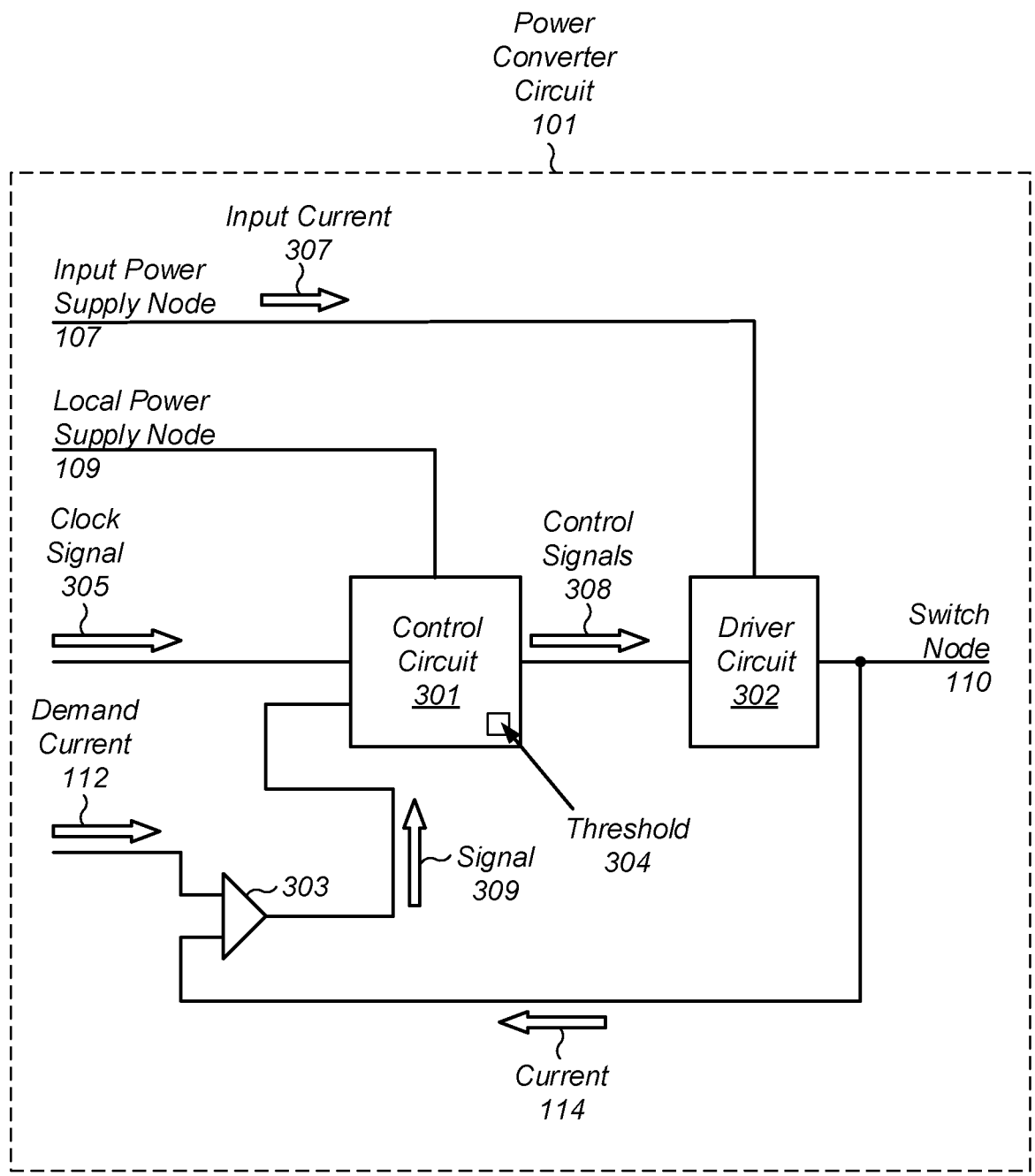
FIG. 3 is a block diagram depicting a different embodiment of a power converter circuit.

Turning to FIG. 3, a block diagram of an embodiment of power converter circuit 101 is depicted. As illustrated, power converter circuit 101 includes control circuit 301, driver circuit 302, and comparator circuit 303.

Control circuit 301 is configured to draw power from local power supply node 109 to generate control signals 308 using clock signal 305 and signal 309. For example, in some embodiments, control circuit 301 may be configured to activate particular ones of control signals 308 in response to an activation of clock signal 305, and de-activate the particular ones of control signals 308 based on signal 309. In various embodiments, control circuit 301 may be configured to generate control signals 308 according to a PWM or PFM regulation mode. Additionally, control circuit 301 may be configured to switch between PWM and PFM based on a result of a comparison between signal 309 and threshold 304.

In some embodiments, control circuit 301 may be further configured to adjust a duration or timing of control signals 308 based on input current 307. In some cases, in response to a determination that a value of input current 307 reaches a threshold value, control circuit 301 may adjust the duration and timing of control signals 308 to limit an amount of current sourced to switch node 110 during on-time periods despite a value of demand current 112. It is noted that although input current 307 is depicted as a current flowing through input power supply node 107, in other embodiments, a value of input current 307 may be encoded using a differential voltage derived using a resistor in series with input power supply node 107.

In various embodiments, control circuit 301 may be implemented using a state machine or other suitable sequential logic circuit. In some cases, control circuit 301 may also include comparator circuits or any other suitable analog circuits.

Driver circuit 302 is configured to selectively couple switch node 110 to either input power supply node 107 or a ground supply node based on control signals 308. When driver circuit 302 couples switch node 110 to input power supply node 107, current flows from input power supply node 107 into switch node 110 and then into regulated power supply node 108 magnetizing inductor 105. When driver circuit 302 couples switch node 110 to the ground supply node, the voltage across inductor 105 is reversed and inductor 105 sources current to regulated power supply node 108 as its magnetic field collapses. As described below, driver circuit 302 may be implemented using multiple switch devices or transistors that are opened and closed using control signals 308.

Comparator circuit 303 is configured to generate signal 309 using demand current 112 and current 114. To generate signal 309, comparator circuit 303 may be further configured to perform a comparison of demand current 112 and current 114, and generate signal 309 using a result of the comparison. In some embodiments, a magnitude of signal 309 may correspond to a difference between demand current 112 and current 114. In other embodiments, signal 309 may be a digital signal whose value corresponds to whether demand current 112 is greater than or less than current 114. In various embodiments, comparator circuit 303 may be implemented using a differential amplifier circuit, a Schmitt trigger circuit, or any other suitable comparator circuit.

Figure 4:
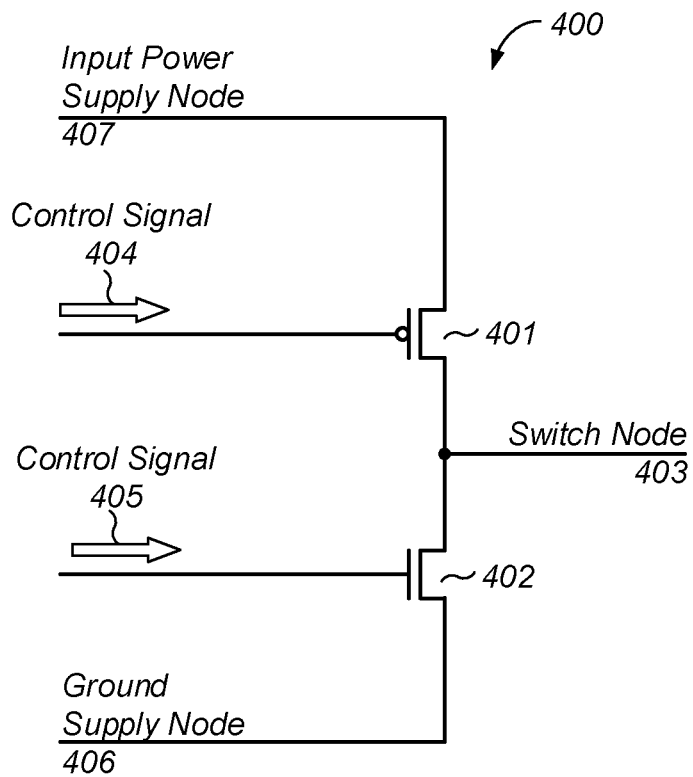
FIG. 4 is a block diagram depicting an embodiment of a driver circuit for a power converter circuit.

Turning to FIG. 4, a block diagram of an embodiment of a driver circuit for a power converter circuit is depicted. As illustrated, driver circuit 400 includes transistors 401 and 402. In various embodiments, driver circuit 400 may correspond to either of driver circuits 202 or 302.

Transistor 401 is coupled between input power supply node 407 and switch node 403, and is controlled by control signal 404. Transistor 402 is coupled between switch node 403 and ground supply node 406, and is controlled by control signal 405. In various embodiments, input power supply node 407 may correspond to either input power supply node 107 or local power supply node 109. In some embodiments, control signals 404 and 405 may correspond to either of control signals 207 or control signals 308.

Transistor 401 is configured, in response to an activation of control signal 404, to couple power supply node 407 to switch node 403. In various embodiments, control signal 404 is activated during a magnetize period of an inductor coupled to driver circuit 400 (e.g., inductor 105). While transistor 401 couples power supply node 407 to switch node 403, current flows from power supply node 407, through transistor 401, into switch node 403, magnetizing the inductor. Transistor 401 is further configured, in response to a deactivation of control signal 404, to de-couple power supply node 407 from switch node 403.

In response to a start of a de-magnetize period, control signal 405 is activated. Transistor 402 is configured, in response to an activation of control signal 405, to couple switch node 403 to ground supply node 406. With switch node 403 coupled to ground, an inductor coupled to switch node 403, e.g., inductor 105, functions as a current source, where the electromotive force to source current to a load circuit is provided by the collapse of the magnetic field of the inductor.

In various embodiments, transistor 401 may be implemented as a p-channel metal-oxide semiconductor field-effect transistor (MOSFET), a fin field-effect transistor (Fin- FET), a gate-all-around field-effect transistor (GAAFET), or any other suitable transconductance device. Transistor 402 may, in various embodiments, be implemented as an n-channel MOSFET, FinFET, GAAFET, or any other suitable transconductance device.

Although both transistors 401 and 402 are depicted as single transistors, in other embodiments, either or both of transistors 401 and 402 may be implemented using multiple transistors. For example, either of transistors 401 or 402 may be implemented using any suitable number of transistors coupled together in parallel, in series, or any suitable combination thereof.

Figure 5:
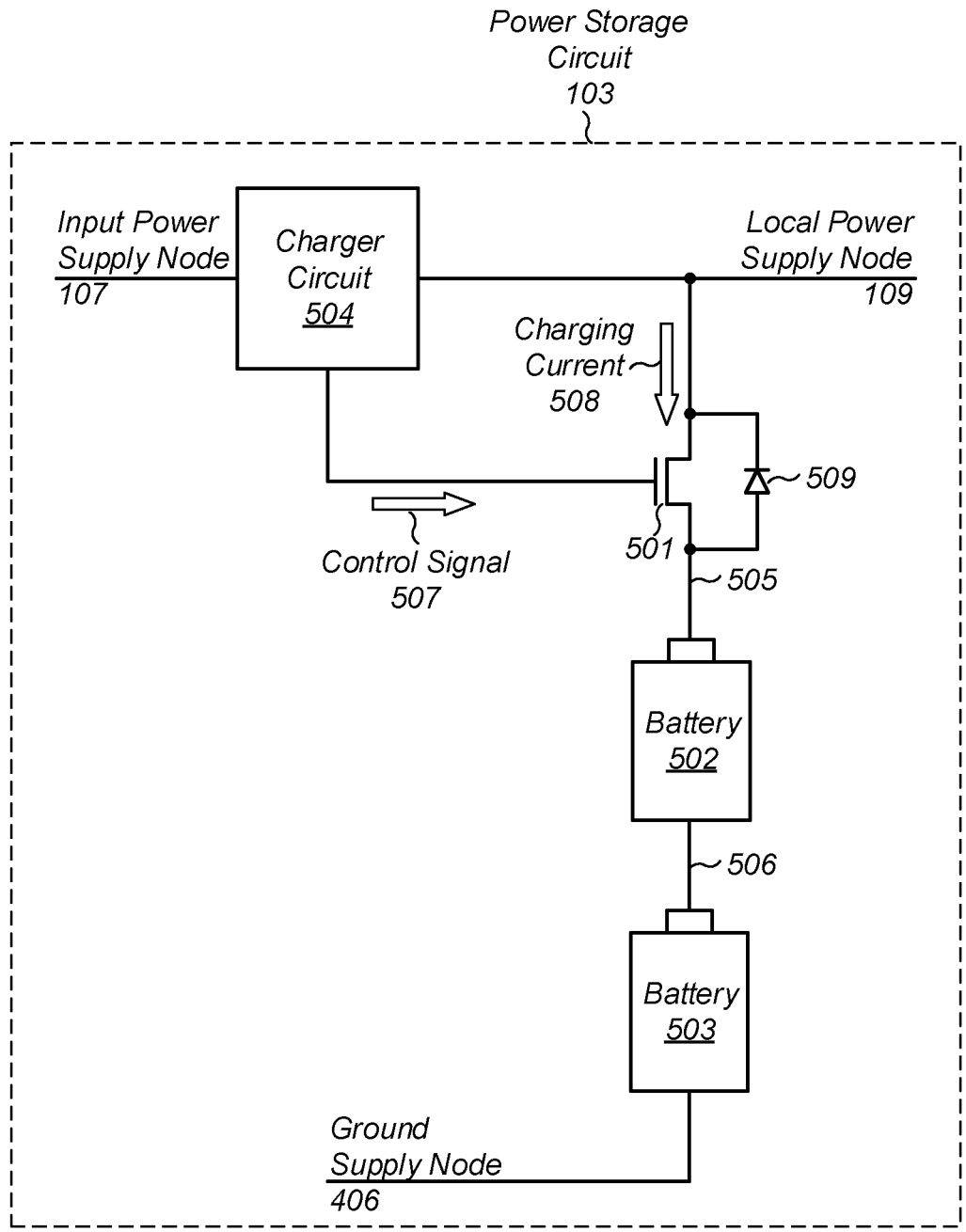
FIG. 5 is a block diagram depicting an embodiment of a power storage circuit.

Turning to FIG. 5, a block diagram of an embodiment of power storage circuit 103 is depicted. As illustrated, power storage circuit 103 includes transistor 501, batteries 502 and 503, diode 509, and charger circuit 504.

Charger circuit 504 is configured to generate a voltage level on local power supply node 109 using a voltage level of input power supply node 107. In some embodiments, the voltage level of local power supply node 109 may be substantially the same as the voltage level of input power supply node 107. In other embodiments, the voltage level of local power supply node 109 may be intentionally different than the voltage level of input power supply node 107. For example, the voltage level of local power supply node 109 may be greater than the voltage level of input power supply node 107.

Charger circuit 504 may, in some embodiments, be implemented using a buck converter circuit, a buck-boost converter circuit, or any other suitable power converter circuit. In other embodiments, charger circuit 504 may include a state machine or other suitable sequential logic circuit configured to track the charging of batteries 502 and 503, and adjust a value of control signal 507 in order to change a value of charging current 508. In some embodiments, charger circuit 504 may also be configured to determine when respective charge levels of batteries 502 and 503 reach threshold values.

Transistor 501 is coupled between local power supply node 109 and node 505, and is controlled by control signal 507. In various embodiments, transistor 501 is configured to adjust a conductance between local power supply node 109 and node 505 to generate charging current 508. For example, in response to an increase in the voltage level of control signal 507, transistor 501 may be configured to increase the conductance between local power supply node 109 and node 505, thereby increasing a value of charging current 508.

In various embodiments, transistor 501 may be implemented as an n-channel MOSFET, FinFET, GAAFET, or any other suitable transconductance device. It is noted that although transistor 501 is depicted as a single transistor, in other embodiments, transistor 501 may be implemented using any suitable number of transistors arranged in a series and/or parallel configuration.

Diode 509 is coupled between local power supply node 109 and node 505. In various embodiments, diode 509 is configured to allow current to flow from batteries 502 and 503 into local power supply node 109 regardless of the state of transistor 501. In such a configuration, batteries 502 and 503 are referred to as being "always connected" to local power supply node 109. In various embodiments, diode 509 provides a power path from batteries 502 and 503 to power converter circuit 102 that quickly services changes in load current demand as well as went input power supply node 107 is disconnected from a power source. In various embodiments, diode 509 may be implemented as a discrete diode, a transistor coupled in a diode-connected fashion, or any other suitable diode structure.

Battery 502 is coupled between node 505 and node 506, while battery 503 is coupled between node 506 and ground supply node 406. In some embodiments, batteries 502 and 503 may be implemented using lithium-ion cells or any other suitable battery chemistry. Although the embodiment of FIG. 5 depicts two batteries coupled together in series, in other embodiments, any suitable number of batteries arranged in any suitable series and/or parallel combination may be employed.

To summarize, various embodiments of a power management circuit are disclosed. Broadly speaking, a power management circuit includes a power storage circuit, a first power converter circuit, and a second power converter circuit. The first power converter circuit coupled to a regulated power supply node via a first inductor, while the second power converter circuit is coupled to the regulated power supply node via a second inductor. The first power converter circuit may be configured to source, based on a demand current, a first current to the regulated power supply node using a voltage level of an input power supply node. The power storage circuit is coupled to a local power supply node and may be configured to generate a particular voltage on the local power supply node. The second power converter circuit may be configured to generate the demand current using a voltage level of the regulated power supply node. In response to a determination that the demand current exceeds a threshold value, the second power converter circuit may be further configured to source, using the particular voltage on the local power supply node, a second current to the regulated power supply node.

Figure 6:
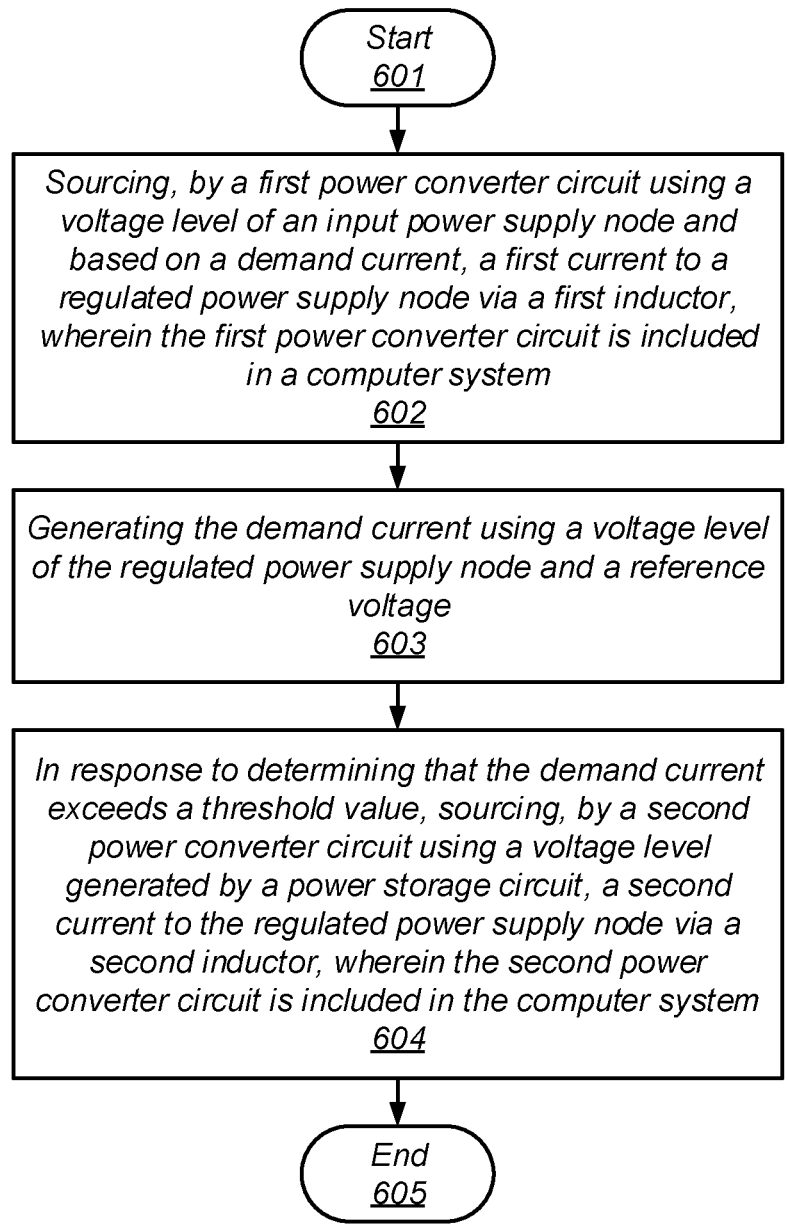
FIG. 6 is a flow diagram depicting an embodiment of a method for operating a power management circuit.

Turning to FIG. 6, a flow diagram depicting an embodiment of a method for operating a power management circuit is illustrated. The method, which may be applied to various power management circuits, e.g., power management circuit 100, begins in block 601.

The method includes sourcing, by a first power converter circuit using a voltage level of an input power supply node, a first current to a regulated power supply node via a first inductor (block 602). In various embodiments, the first power converter circuit is included in a computer system. In some embodiments, the method may further include switching, by the first power converter circuit, a regulation mode based on a value of the demand current.

The method further includes generating the demand current using a voltage level of the regulated power supply node (block 603). In various embodiments, generating the demand current includes performing a comparison of the voltage level of the regulated power supply node and a reference voltage. The method may also include generating the demand current using a result of the comparison.

The method also includes, in response to determining that the demand current exceeds a threshold value, sourcing, by a second power converter circuit using a voltage level generated by a power storage circuit, a second current to the regulated power supply node via a second inductor (block 604). In various embodiments, the second power converter circuit is also included in the computer system.

In some embodiments, the power storage circuit includes at least one battery. The method may further include charging, by a charging circuit, the at least one battery using the voltage level of the input power supply node. In other embodiments, the method may also include, in response to detecting that a power source has been disconnected from the input power supply node, halting, by the charging circuit, charging of the at least one battery.

The method may further include, in response to detecting that the power source has been disconnected from the input power supply node, de-activating the first power converter circuit, and activating the second power converter circuit. The method concludes in block 605.

Figure 7:
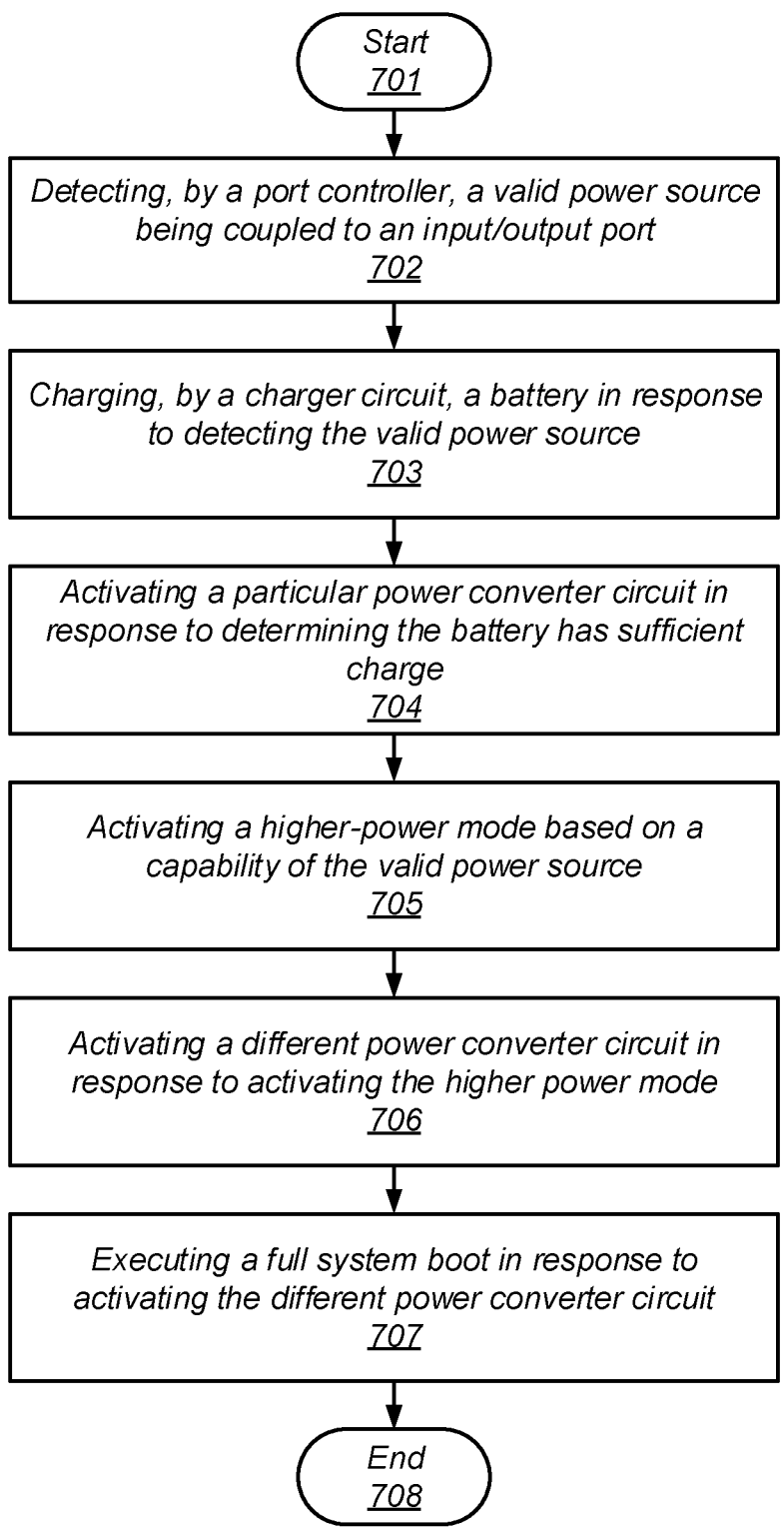
FIG. 7 is a flow diagram depicting a different embodiment of a method for operating a power management circuit.

Turning to FIG. 7, a flow diagram depicting an embodiment of a method for operating a power management circuit during a power source plugin is illustrated. The method, which may be applied to various power management circuits, e.g., power management circuit 100, begins in block 701.

The method includes detecting, by a port controller, a valid power source being coupled to an input/output port (block 702). In various embodiments, detecting the valid power source may include receiving, by the port controller, information from the valid power source. In some cases, the information may include data indicative of a maximum current that can be supplied, etc. Alternatively, detecting the valid power source may include checking, by the port controller, a voltage level generated by the valid power source, measuring current being sourced by the valid power source, and the like.

The method further includes charging, by a charger circuit, a battery in response to detecting the valid power source (block 703). In various embodiments, charging the battery may include generating, by the charging circuit, a voltage level on an internal power supply node. The method may further include generating a charging current using the voltage level of the internal power supply node. In other embodiments, the method may also include adjusting a value of the charging current based on an amount of charge stored in the battery.

The method also includes activating a particular power converter circuit in response to determining the battery has sufficient charge (block 704). In various embodiments, the method may further include comparing an amount of charge stored in the battery to a threshold value. In some cases, the method may also include tracking a period of time the charging current is applied to the battery to determine the amount of charge stored in the battery. In some embodiments, activating the particular power converter circuit may include determining a switching frequency and regulation mode for the particular power converter circuit.

The method further includes activating a higher-power mode based on a capability of the valid power source (block 705). In some embodiments, activating the higher-power mode includes changing one or more operational parameters of the computer system. For example, in some cases, at least one of the one or more operational parameters may correspond to a frequency of a clock signal used in the computer system. In other embodiments, activating the higher-power mode may include activating one or more circuit blocks included in the computer system.

The method also includes activating a different power converter circuit in response to activating the higher power mode (block 706). As described above, the different power converter circuit may be coupled to the input/output port and draw power from the valid power source. The method may also include providing, by the different power converter circuit, an average current to one or more load circuits.

The method further includes executing a full system boot in response to activating the different power converter circuit (block 707). In various embodiments, executing a full-system boot can include activating any inactive circuit blocks in the computer system, and setting the one or more operational parameters to values corresponding to high-performance settings. The method concludes in block 708.

Figure 8:
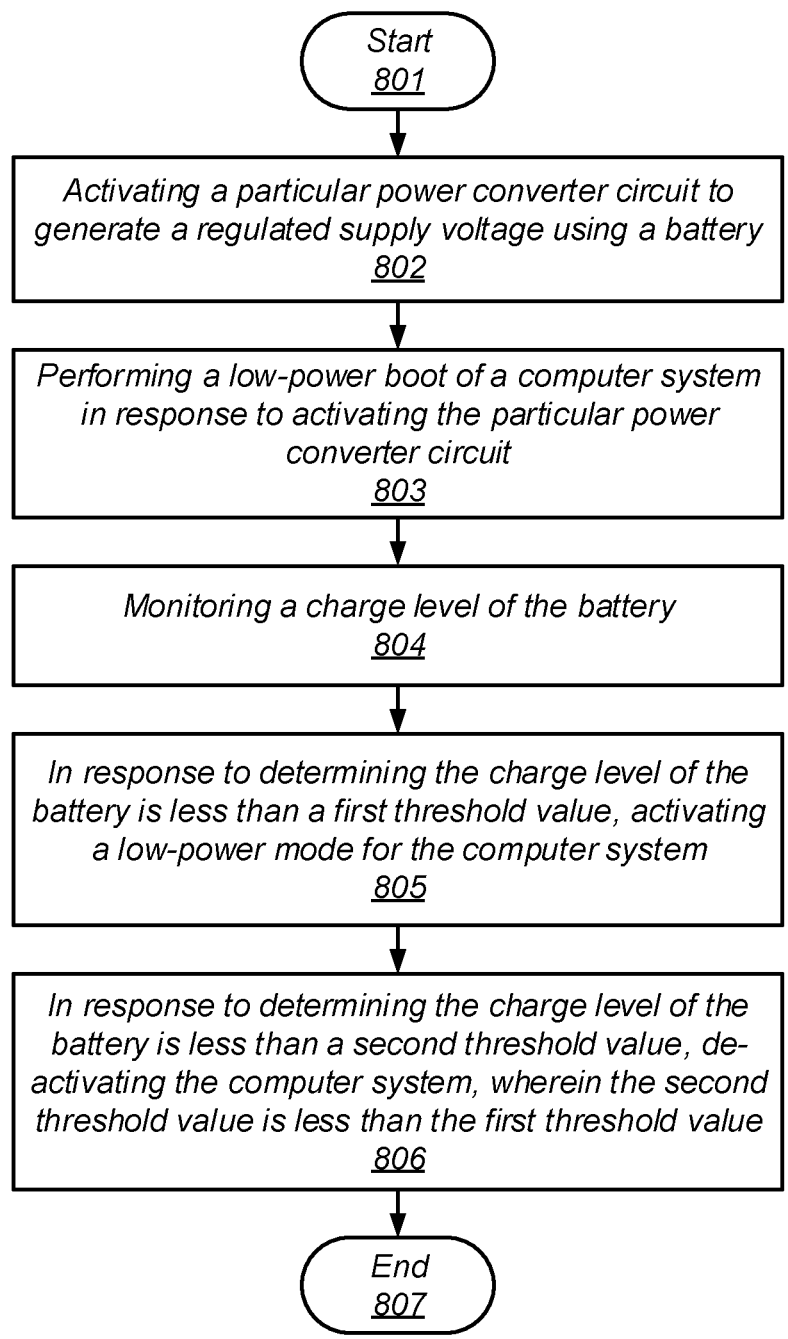
FIG. 8 is a flow diagram depicting another embodiment of a method for operating a power management circuit.

Turning to FIG. 8, a flow diagram depicting an embodiment of a method for operating a power management circuit during a turn-on operation when an external power source is available and an included battery is fully charged is illustrated. The method, which may be applied to various power management circuits, e.g., power management circuit 100, begins in block 801.

The method includes activating a particular power converter circuit to generate a regulated supply voltage using a battery (block 802). In various embodiments, activating the particular power converter circuit may include cycling through multiple on-time and off-time periods to source current to a regulated power supply node.

The method also includes performing a low-power boot of a computer system in response to activating the particular power converter circuit (block 803). In some embodiments, performing a low-power boot of the computer system may include setting one or more operational parameters of the computer system to values corresponding to low-power settings for one or more circuit blocks. For example, the one or more operational parameters may include a setting for a clock signal used by various circuit blocks included in the computer system.

The method further includes monitoring a charge level of the battery (block 804). In various embodiments, monitoring the charge level of the battery may include measuring an amount of current drawn from the battery over a period of time. In some embodiments, monitoring the charge level of the battery may also include tracking a voltage level generated by the battery.

The method also includes, in response to determining the charge level of the battery is less than a first threshold value, activating a low-power mode for the computer system (block 805). In various embodiments, activating the low-power mode may include de-activating one or more high-power circuits, reducing a frequency of a clock signal used by one or more circuits included in the computer system, and the like.

The method further includes, in response to determining the charge level of the battery is less than a second threshold value, de-activating the computer system (block 806). In various embodiments, the second threshold value is less than the first threshold value.

Figure 9:
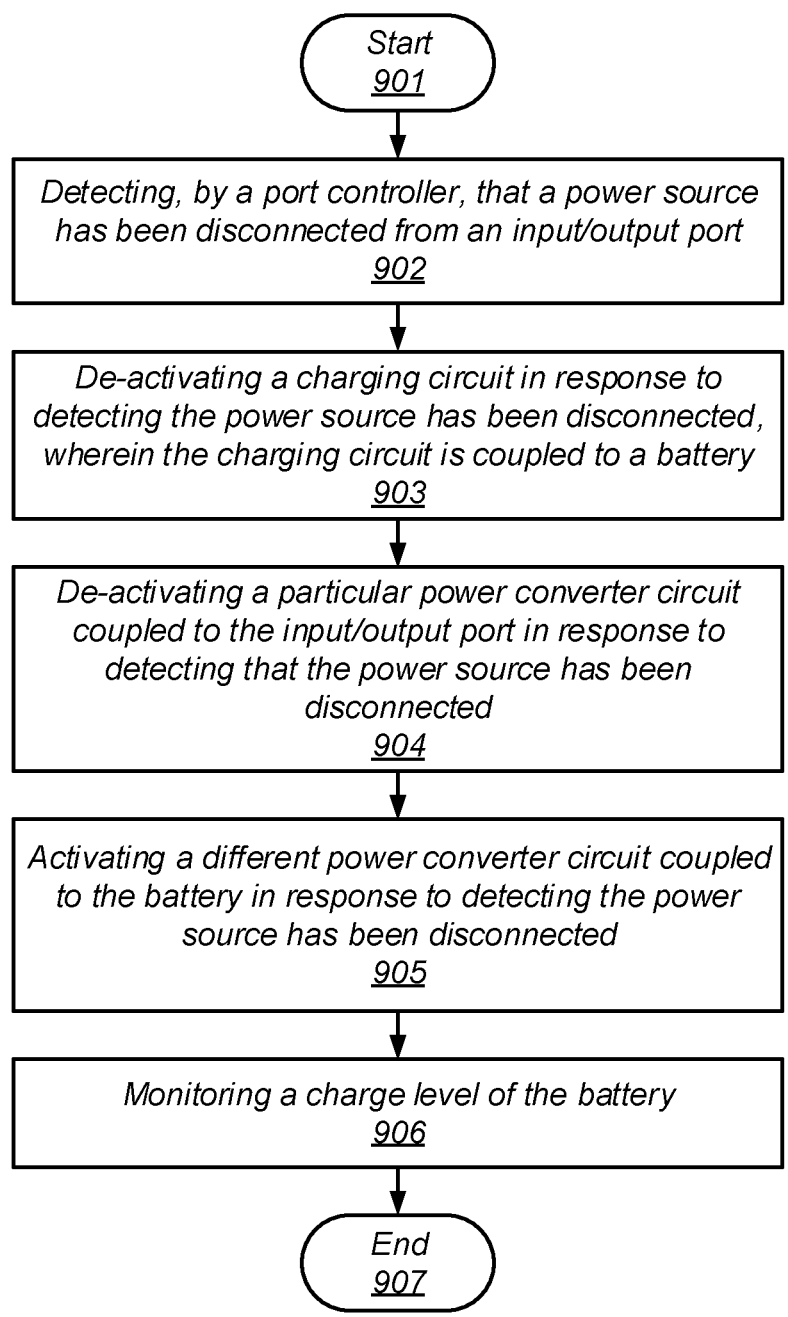
FIG. 9 is a flow diagram depicting a particular embodiment of a method for operating a power management circuit.

In some cases, a computer system can continue to operate when a power source has been removed by relying on a power storage circuit such as power storage circuit 103, for example. A flow diagram depicting an embodiment of a method of operating a power management circuit when a power source is removed is illustrated in FIG. 9. The method, which may be applied to various power management circuits, e.g., power management circuit 100, begins in block 901.

The method includes detecting, by a port controller, that a power source has been disconnected from an input/output port (block 902). In various embodiments, the input/output port may correspond to a USB port or any other suitable input/output port.

The method further includes de-activating a charging circuit in response to detecting the power source has been disconnected (block 903). As described above, in various embodiments, the charging circuit may be coupled to one or more batteries and may be implemented as a buck-boost converter circuit, or any other suitable power converter circuit.

The method also includes de-activating a particular power converter circuit coupled to the input/output port in response to detecting that the power source has been disconnected (block 904). In various embodiments, the particular power converter circuit may correspond to power converter circuit 101 as depicted in FIG. 1, and may be configured to provide power to a load circuit during average current demand from the load circuit.

The method further includes activating a different power converter circuit coupled to the battery in response to detecting the power source has been disconnected (block 905). In some embodiments, the different power converter circuit may correspond to power converter circuit 102 as depicted in FIG. 1. As described above, the different power converter circuit may be configured to provide additional power to the load circuit during transient peaks in current demand from the load circuit. In response to detecting the power source has been disconnected, the different power converter circuit may take over providing power during both average and peak current demand from the load circuit.

The method also includes monitoring a charge level of the battery (block 906). In various embodiments, the computer system may perform additional operations based on the monitored charge level of the battery. For example, in some embodiments, the operations described in blocks 805 and 806 of FIG. 8 may also be performed in regard to the embodiment of the method illustrated in the flow diagram of FIG. 9. The method concludes in block 907.

Figure 10:
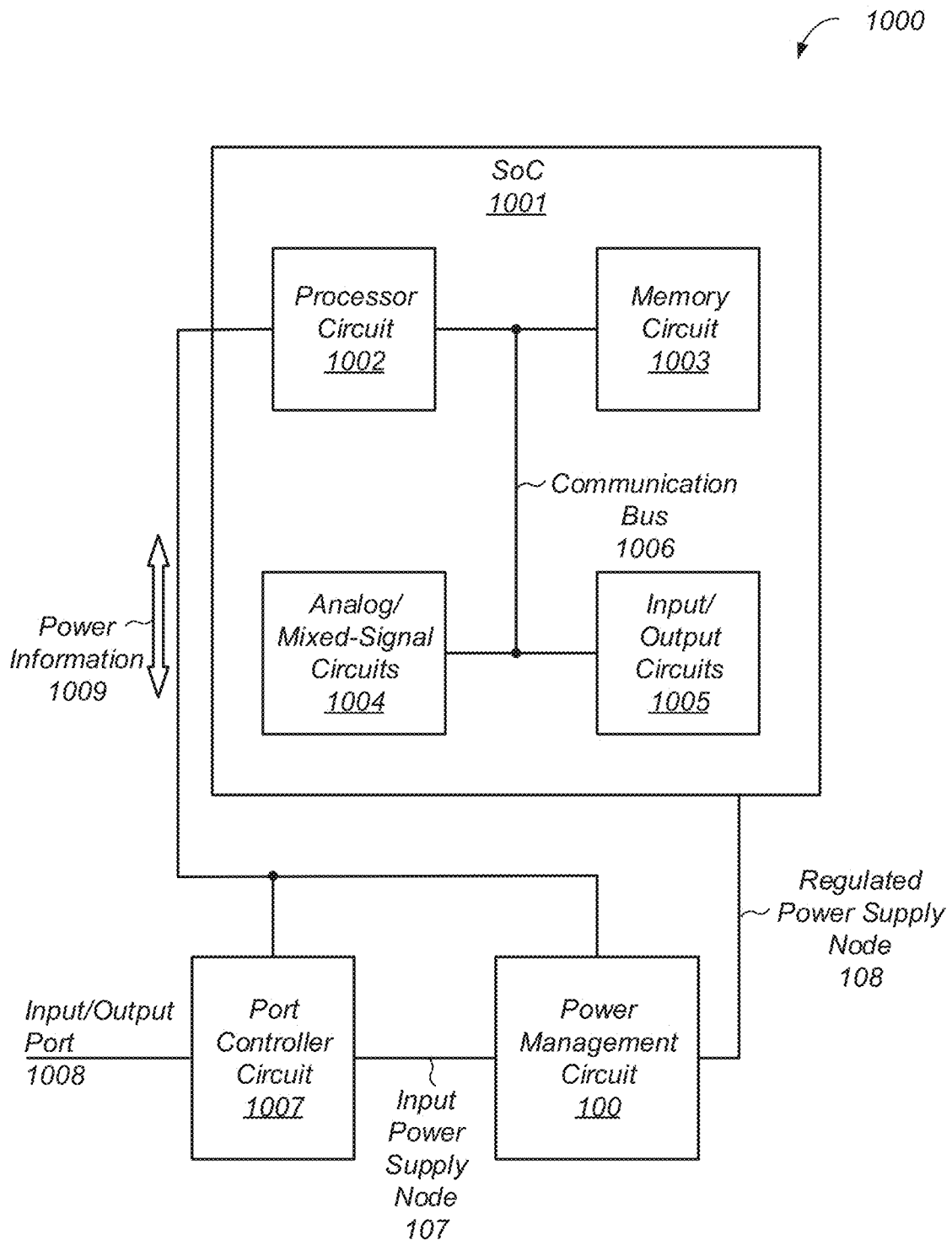
FIG. 10 is a block diagram of an embodiment of a system-on-a-chip.

A block diagram of a computer system is depicted in FIG. 10. In the illustrated embodiment, computer system 1000 includes system-on-a-chip (SoC) 1001, port controller circuit 1007, and power management circuit 100. SoC 1001 includes processor circuit 1002, memory circuit 1003, analog/mixed-signal circuits 1004, and input/output circuits 1005 all connected by communication bus 1006. In various embodiments, computer system 1000 may be configured for use in a desktop computer, server, in a mobile computing application such as a tablet, laptop computer, or wearable computing device.

Port controller circuit 1007 is coupled to input/output port 1008. In various embodiments, port controller circuit 1007 is configured to detect a valid power source coupled to input/output port 1008, and send information regarding the valid power source to power management circuit 100 and processor circuit 1002 using power information 1009. In various embodiments, input/output port 1008 may be a Universal Serial Bus (USB) port or any other suitable communication port.

Although port controller circuit 1007 and power management circuit 100 are depicted as being separate from SoC 1001, in other embodiments, one or both of port controller circuit 1007 or power management circuit 100 may be included on a common integrated circuit with SoC 1001. In some cases, inductors 105 and 106 included in power management circuit 100 may be located on a different integrated circuit than the rest of power management circuit 100, or they may be discrete components coupled to a common circuit board or substrate along with the remaining portions of power management circuit 100.

Processor circuit 1002 may, in various embodiments, be representative of a general-purpose processor that performs various operations in response to executing program or software instructions. For example, processor circuit 1002 may be a central processing unit (CPU) such as a microprocessor, a microcontroller, an application-specific integrated circuit (ASIC), or a field-programmable gate array (FPGA).

In various embodiments, processor circuit 1002 may be configured to exchange power information 1009 with port controller circuit 1007 and power management circuit 100. Processor circuit 1002 may, in some embodiments, be configured to set SoC 1001 to different power modes (e.g., high-power mode, low-power mode, etc.) based on power information 1009. To set the different power modes, processor circuit 1002 may be further configured to adjust clock frequencies, power supply voltage levels, etc. Additionally, processor circuit 1002 may be configured to the operation of power converter circuits included in power management circuit 100.

Memory circuit 1003 may, in various embodiments, include any suitable type of memory such as a dynamic random-access memory (DRAM) circuit, a static random-access memory (SRAM) circuit, a read-only memory (ROM) circuit, an electrically erasable programmable read-only memory (EEPROM) circuit, or a non-volatile memory circuit, for example. It is noted that, although a single memory circuit is illustrated in FIG. 10, in other embodiments, any suitable number of memory circuits may be employed.

Analog/mixed-signal circuits 1004 may include a crystal oscillator circuit, an analog-to-digital converter (ADC) circuit, a digital-to-analog converter (DAC) circuit, and a phase-locked loop circuit (all not shown). In other embodiments, analog/mixed-signal circuits 1004 may be configured to generate respective voltage levels on local power supply nodes included in SoC 1001.

Input/output circuits 1005 may be configured to coordinate data transfer between SoC 1001 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1005 may be configured to implement a version of Universal Serial Bus (USB) protocol or IEEE 1394 (Firewire®) protocol.

Input/output circuits 1005 may also be configured to coordinate data transfer between SoC 1001 and one or more devices (e.g., other computing systems or integrated circuits) coupled to SoC 1001 via a network. In one embodiment, input/output circuits 1005 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1005 may be configured to implement multiple discrete network interface ports.

Figure 11:
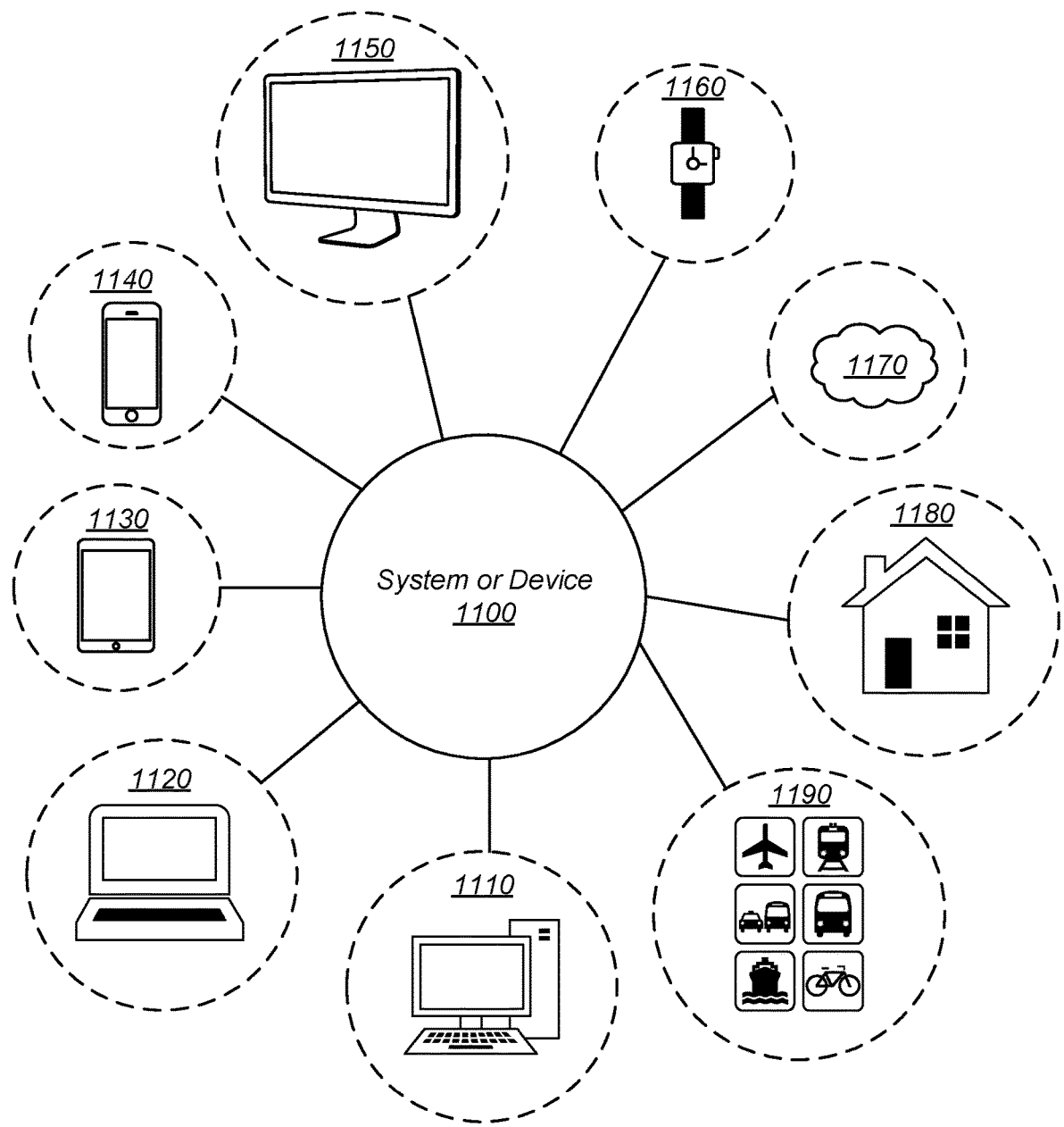
FIG. 11 is a block diagram of various embodiments of computer systems that may include power management circuits.

Turning to FIG. 11, various types of systems that may include any of the circuits, devices, or systems discussed above are illustrated. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions. For example, smartwatches may provide access to e-mail, cellular service, calendar, health monitoring, etc. A wearable device may also be designed solely to perform health-monitoring functions, such as monitoring a user's vital signs, performing epidemiologic functions such as contact tracing, providing communication to an emergency medical service, etc. Other types of devices are also contemplated, including devices worn on the neck, implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server-based computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in control systems, guidance systems, entertainment systems, etc. of various types of vehicles 1190.

The applications illustrated in FIG. 11 are merely examples and not intended to limit the potential future applications of disclosed systems or devices. Other example applications include, without limitation: portable gaming devices, music players, data storage devices, unmanned aerial vehicles, etc.

Figure 12:
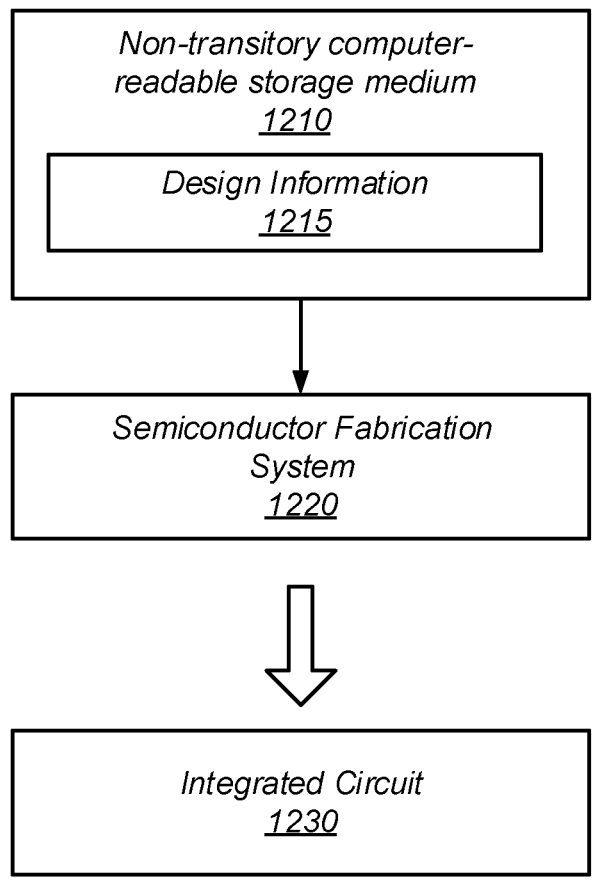
FIG. 12 illustrates an example of a non-transitory computer-readable storage medium that stores circuit design information.

FIG. 12 is a block diagram depicting an example of a non-transitory computer-readable storage medium that stores circuit design information. In various embodiments, semiconductor fabrication system 1220 is configured to process design information 1215 stored on non-transitory computer-readable storage medium 1210 and fabricate integrated circuit 1230 based on design information 1215.

Non-transitory computer-readable storage medium 1210 may include various appropriate types of memory devices or storage devices. Non-transitory computer-readable storage medium 1210 may be an installation medium, e.g., a CD-ROM, floppy disks, or a tape device. Alternatively, non-transitory computer-readable storage medium 1210 may be a computer system memory or random-access memory such as dynamic random-access memory (DRAM), double data-rate random-access memory (DDR RAM), static random-access memory (SRAM), extended data out random-access memory (EDO RAM), Rambus RAM, etc. In some cases, non-transitory computer-readable storage medium 1210 may include non-volatile memory such as flash memory, magnetic media, e.g., a hard drive, or optical storage, registers, or other similar types of memory elements, etc. Non-transitory computer-readable storage medium 1210 may include two or more memory mediums, which may reside in different locations, e.g., in different computer systems that are connected over a network.

Design information 1215 may be specified using any of various appropriate computer languages, including hardware description languages such as, without limitation: VHDL, Verilog, SystemC, System Verilog, RHDL, M, MyHDL, and the like. Design information 1215 may be usable by semiconductor manufacturing system 1220 to fabricate at least a portion of integrated circuit 1230. The format of design information 1215 may be recognized by at least one semiconductor fabrication system, such as semiconductor fabrication system 1220, for example. In some embodiments, design information 1215 may include a netlist that specifies elements of a cell library, as well as their connectivity. One or more cell libraries used during logic synthesis of circuits included in integrated circuit 1230 may also be included in design information 1215. Such cell libraries may include information indicative of device or transistor level netlists, mask design data, characterization data, and the like, of the cells included in the cell library.

Integrated circuit 1230 may, in various embodiments, include one or more custom macrocells, such as memory circuits analog circuits, or mixed-signal circuits, and the like. In such cases, design information 1215 may include information related to such included macrocells. Such information may include, without limitation, schematics capture database information, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer which may include masking), removing materials, altering the shape of deposited materials, modifying materials (e.g., by doping materials or modifying dielectric constants using ultraviolet processing), etc., Semiconductor fabrication system 1220 may also be configured to perform various testing of fabricated circuits for correct operation.

In various embodiments, integrated circuit 1230 is configured to operate according to a circuit design specified by design information 1215, which may include information regarding performing any of the functionality described herein. For example, integrated circuit 1230 may include any of various elements show or described herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The word "may" is used herein in a permissive sense (i.e., having the potential to, being able to) and not in a mandatory sense (i.e., must).

The terms "comprising" and "including" and forms thereof, are open-ended and mean "including, but not limited to."

When the term "or" is used in this disclosure with respect to a list of options, it will be generally understood to be used in the inclusive sense unless context provides otherwise.

Various labels may proceed nouns in this disclosure. Unless context provides otherwise, different labels used for a feature (e.g., "first circuit," "second circuit," "particular circuit," "given circuit," etc.) refer to distinct instances of the feature. The labels "first," "second," "third," etc., when applied to a particular feature do not imply any type of ordering (e.g., spatial, temporal, logical, etc.), unless otherwise stated.

Within this disclosure, different entities (which may be variously be referred to as "units," "circuits," other components, etc.) may be described or claimed as "configured" to perform one or more tasks or operations. This formulation—[entity] configured to [perform one or more tasks]—is used herein to refer to structure, i.e., something physical. More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An un-programmed field-programmable gate array (FPGA), for example, would not be considered to be "configured to" perform some specific function. This un-programmed FPGA may, however, be "configurable to" perform that function.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors.

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An apparatus, comprising:
    a power storage circuit configured to generate a local supply voltage on a local power supply node;
    a first power converter circuit coupled to a regulated power supply node via a first inductor, wherein the first power converter circuit is configured to:
        source, based on a demand current, a first current to the regulated power supply node using a voltage level of an input power supply node, wherein a voltage level of the local power supply node is greater than the voltage level of the input power supply node; and
        switch from a first regulation mode to a second regulation mode based on a value of the demand current; and
    a second power converter circuit coupled to the regulated power supply node via a second inductor, wherein the second power converter circuit is configured to:
        generate the demand current using a voltage level of the regulated power supply node; and
        in response to a determination that the demand current exceeds a threshold value, source a second current to the regulated power supply node using the voltage level of the local power supply node.

2. The apparatus of claim 1, wherein the power storage circuit includes one or more batteries and further comprising, a charger circuit configured to source a charging current to the one or more batteries using the voltage level of the input power supply node.

3. The apparatus of claim 2, wherein to charge the power storage circuit, the charger circuit is further configured to adjust a value of the charging current based on an amount of charge stored in the one or more batteries.

4. The apparatus of claim 1, wherein to generate the demand current, the second power converter circuit is further configured to compare the voltage level of the regulated power supply node to a reference voltage.

5. A method, comprising:
    sourcing, by a first power converter circuit using a voltage level of an input power supply node and based on a demand current, a first current to a regulated power supply node via a first inductor, wherein the first power converter circuit is included in a computer system;
    generating the demand current using a voltage level of the regulated power supply node and a reference voltage; and
    in response to determining the demand current exceeds a threshold value, sourcing, by a second power converter circuit using a voltage level generated by a power storage circuit, a second current to the regulated power supply node via a second inductor, wherein the second power converter circuit is included in the computer system; and
    in response to detecting that a power source has been disconnected from the input power supply node:
        de-activating the first power converter circuit; and
        activating the second power converter circuit; and
    activating, by the computer system, a low-power mode in response to determining that the voltage level generated by the power storage circuit is less than a first voltage threshold.

6. The method of claim 5, wherein the power storage circuit includes at least one battery and, further comprising, charging, by a charging circuit, the at least one battery using the voltage level of the input power supply node.

7. The method of claim 6, further comprising, in response to detecting that the power source has been disconnected from the input power supply node, halting, by the charging circuit, charging of the at least one battery.

8. The method of claim 5, further comprising, initiating, by the computer system, a shutdown operation in response to determining that the voltage level generated by the power storage circuit is less than a second voltage threshold, wherein the second voltage threshold is less than the first voltage threshold.

9. The method of claim 5, further comprising, switching, by the first power converter circuit, a regulation mode based on a value of the demand current.

10. A system, comprising:
   a storage circuit configured to generate a local supply voltage;
   a processor circuit coupled to a regulated power supply node;
   a first power converter circuit configured to:
      source, using an input power source and based on a demand current, a first current to the regulated power supply node via a first inductor; and
      be deactivated, in response to a determination that the input power source has been disconnected; and
   a second power converter circuit configured to:
      generate the demand current using a voltage level of the regulated power supply node and a reference voltage;
      source, using the local supply voltage, a second current to the regulated power supply node via a second inductor in response to a determination that the demand current exceeds a threshold value; and
      be activated, in response to the determination that the input power source has been disconnected; and
   wherein the processor circuit is configured to activate a low-power mode in response to a determination that the local supply voltage is less than a first voltage threshold.

11. The system of claim 10, wherein the storage circuit includes at least one battery and, further comprising:
   a charging circuit configured to charge the at least one battery using the input power source.

12. The system of claim 11, wherein the charging circuit is further configured, in response to detecting that the input power source has been disconnected, to halt charging of the at least one battery.

13. The system of claim 10, wherein the processor circuit is further configured to initiate a shutdown operation in response to the determination that the local supply voltage is less than a second voltage threshold, wherein the second voltage threshold is less than the first voltage threshold.

14. The system of claim 10, wherein the first power converter circuit is further configured to switch a regulation mode based on a value of the demand current.

\* \* \* \* \*